United States Patent [19]
Yen et al.

[11] 4,325,433
[45] Apr. 20, 1982

[54] PRE-CAUSTIC FLOOD TREATMENT

[75] Inventors: Teh Fu Yen, Altadena; Mankin Chan, Los Angeles, both of Calif.

[73] Assignee: University of Southern California, Los Angeles, Calif.

[21] Appl. No.: 163,531

[22] Filed: Jun. 27, 1980

[51] Int. Cl.³ ............................................. E21B 43/22
[52] U.S. Cl. ................................. 166/273; 166/271; 166/274
[58] Field of Search ............... 166/273, 274, 270, 271, 166/307

[56] References Cited

U.S. PATENT DOCUMENTS

| | | | |
|---|---|---|---|
| 2,161,085 | 6/1939 | Phalen | 166/307 X |
| 3,111,984 | 11/1963 | Reisberg | |
| 3,141,501 | 7/1964 | Bernard et al. | 166/274 |
| 3,344,858 | 10/1967 | Gilchrist et al. | |
| 3,387,655 | 6/1968 | Hurd | 166/273 X |
| 3,568,772 | 3/1971 | Gogarty et al. | 166/273 |
| 3,625,284 | 12/1971 | Gogarty et al. | 166/273 |
| 3,871,453 | 3/1975 | Sarem | 166/273 X |
| 3,926,255 | 12/1975 | Williams | 166/273 X |
| 3,927,716 | 12/1975 | Burdyn et al. | 166/270 |
| 3,929,190 | 12/1975 | Chang et al. | 166/274 |

OTHER PUBLICATIONS

Cooke, Jr., C. E., et al., "Oil Recovery by Alkaline Waterflooding", *Journal of Petroleum Technology*, Dec. 1974, pp. 1365–1374.

*Primary Examiner*—Stephen J. Novosad
*Attorney, Agent, or Firm*—Nilsson, Robbins, Dalgarn, Berliner, Carson and Wurst

[57] ABSTRACT

A process for the recovery of oil from a subteranean oil-bearing formation, in which the formation is potentiated to recovery by alkaline flooding by introducing an aqueous solution of acid selected from mineral acids and organic acids having less than 5 carbon atoms per molecule.

21 Claims, 2 Drawing Figures

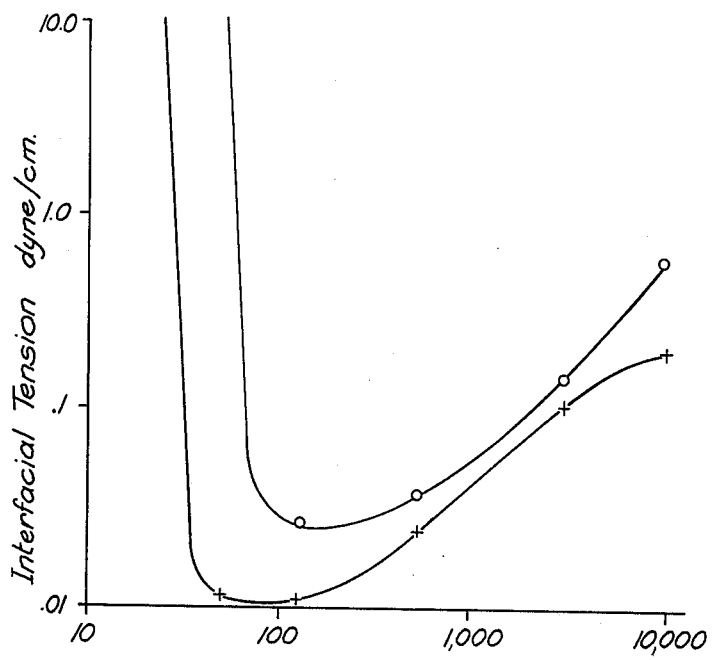
FIG. 1  PPM Sodium orthosilicate
(7,500 PPM NaCl)
○ = original crude
+ = crude shaken with 0.2 N HCl
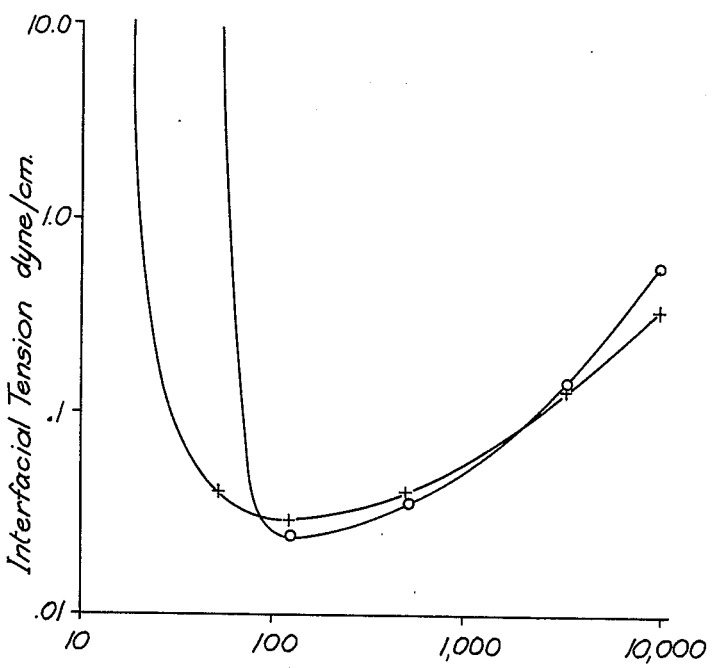
FIG. 2  PPM Sodium orthosilicate
(7,500 PPM NaCl)
○ = original crude
+ = alkali exhausted, then acidified with 0.2 N HCl

PRE-CAUSTIC FLOOD TREATMENT

FIELD OF THE INVENTION

The field of art to which the invention pertains includes the field of tertiary oil recovery, particularly by the injection of alkaline flood water.

BACKGROUND AND SUMMARY OF THE INVENTION

Since only a portion of the oil contained in a subterranean oil-bearing formation can be recovered by primary methods, it has been conventional practice to employ various secondary and tertiary recovery techniques to produce additional quantities of oil. One of the most widely practiced secondary techniques is the displacement of oil from the formation with a driving fluid such as flood water ejected for that purpose. Normally, in carrying out a water flooding procedure, a series of input wells spaced apart from one or more production wells are drilled into and opened to the oil-producing formation. Flood water, which often contains salt, is injected into the reservoir under pressure, forcing some of the oil towards the production well or wells where the oil is recovered.

Tertiary techniques have been developed which seek to reduce the oil-water interfacial tension, either by injecting aqueous surfactant solutions into the oil formation, or by forming surfactants in situ. In this regard, crude petroleum is known to contain varying amounts of surfactant-yielding materials. These have generally been thought of as being simply saponifiable materials such as petroleum acids which can react with alkaline materials to form soaps that reduce the interfacial tension between the crude petroleum and water. Accordingly, the use of alkaline water-flooding, to activate such surfactants as a tertiary recovery mechanism, has been extensively investigated.

Various investigators, such as Reisberg, in U.S. Pat. No. 3,111,984, and Gilchrist et al, in U.S. Pat. No. 3,344,858, have proposed adding soap-forming organic acids, generally containing about 6-40 carbon atoms per molecule, to the oil formation, either prior to or subsequent to injection of alkaline solution, with the aim of forming additional surfactant to aid in lowering the surface tension of the formation oil. However, it is now apparent that the alkaline waterflooding method for enhanced oil recovery is a complex process. Cooke, Williams, and Kolodzie, J. Petrl. Tech. 26 (12), 1365 (1974) found that though in situ oxidation with air further increases the acid number of a given crude oil, this artificially created high-acid-number crude oil could not successfully be flooded with alkaline water. Also, investigators have identified compounds other than carboxylic acids, such as phenols or porphyrins, as beneficial to oil recovery due to the low interfacial tensions they exhibit.

It has also been found that the ability of an alkaline flooding procedure to lower interfacial tension is transient, and is often lost during the time of oil-alkali contact, with the result that substantial amounts of oil, otherwise recoverable by alkaline floodwater procedures remain behind in the oil formation. Furthermore, even when a formation is subjected to repeated injections of floodwater to the point of depletion of recoverable oil, there still remains a substantial amount of oil trapped within the formation; in many cases, substantially more oil remains within the formation than is recovered by alkaline flooding.

The present invention provides a process for recovering oil from a formation in addition to that which is recoverable by alkaline flooding. The process is useful prior to alkaline flooding to enhance the effectiveness of an alkaline flooding procedure, as well as to enable recovery from a formation which has been substantially depleted by alkaline flooding. In accordance herewith, at least part of the oil in the oil-bearing formation is potentiated for further or increased recovery by alkaline flooding by introducing into the formation an aqueous solution of acid selected from mineral acids and organic acids having less than 5 carbon atoms per molecule. Thereafter, alkaline floodwater is introduced to displace potentiated oil from the formation to one or more production wells.

It will be appreciated that the acid referred to is not the type of acid which has been used by prior investigators for the formation of surfactants in situ; they are not soap-forming acids. Also the acids are not being used merely to disintegrate rocks to facilitate the ease of flow; such a process is commonly referred to as acidization. Although the mechanism is not fully understood, the acid appears to reinduce lost activity in the oil formation, with the result that additional alkaline flooding is effective in displacing additional amounts of oil. Also, oil-bearing formations which have not been exposed to alkaline can be made more active by initial contact with the acid, thereby making the first alkaline flooding procedure more effective.

In greater detail, a tertiary process is provided for the recovery of oil from a substantially watered-out subterranean oil-bearing formation. The formation is penetrated by spaced injection and production wells, in accordance with usual procedure, and an aqueous solution of an acid as aforesaid is introduced into the formation. Preferably, at least one pore volume of the acid solution is passed through the formation at a concentration of at least 0.05 normal. The potentiated oil in the formation can then be water-flooded to substantially decrease acidity, following which alkaline flood water is introduced resulting in displacement of oil to the production well or wells. The cycle can be repeated for the recovery of still additional oil. In each case, to conserve acid or alkaline, prior acid or alkaline, prior to each step of acidification and alkaline-flooding, the oil-bearing formation is washed with flood water, e.g. ground water or saline water such as brine.

BRIEF DESCRIPTION OF THE DRAWINGS

FIG. 1 is a graph illustrating the relationship of interfacial surface tension with water and various alkalinity levels, expressed in terms of the concentration of sodium orthosilicate, for crude oil, and for oil contacted with 0.2 normal hydrochloric acid; and FIG. 2 is a similar graph in which one of the lines plotted represents crude oil, while the other line represents oil remaining after alkaline treatment, which has been reactivated by contact with 0.2 normal hydrochloric acid.

DETAILED DESCRIPTION

As above indicated, the present invention involves the introduction of an aqueous solution of acid to an oil-bearing formation as part of an enhanced tertiary recovery operation. The acid is not the soap-forming type of acid previously referred to by the art, but is either a mineral acid or an organic acid having less than 5 carbon atoms per molecule. One could use any of the commonly available acids which will, at the concentration used, not excessively oxidize the formation oil. Examples include hydrochloric acid, sulfuric acid, orthophosphoric acid, sulfurous acid, carbonic acid, formic acid, acetic acid, oxalic acid, chloracetic acid, propionic acid, and n-butyric acid. Mineral acids are preferred, particularly readily available, economical, and easily used acids, for example hydrochloric acid, sulfuric acid, and the like. Again preferably, the acid should be in sufficient concentration so that excessive flooding is not required. A range of from 0.01 to 1.0 normal is generally satisfactory, with a preferred range being about 0.1 to 0.4 normal.

Since any amount of acid will serve to potentiate at least a portion of the oil in a formation, one can introduce as little as 0.1 pore volume into the formation, in excess of that which may be consumed by the formation rock (depending on the nature and history of the formation), but it is preferred to use at least 1 pore volume; of course there is no meaningful upper limit—3 or 4 pore volumes will generally be sufficient.

It is contemplated that the acid will be added after secondary oil recovery, i.e., after the formation has been depleted of oil recoverable by simple water flooding, by ground water or brine. However, there is no reason to be limited to that sequence, particularly where prior tests have indicated low production with such secondary procedures. It is also contemplated that the oil-bearing formation will usually have been subjected to a tertiary recovery procedure in which a surfactant and/or alkaline floodwater has been introduced and tertiary oil recovery has been accomplished. Again, the process is not limited to the sequence since the introduction of acid the solution as provided herein will serve to enhance recovery by alkaline flooding regardless of the stage of introduction.

If the acid solution is added after an alkaline flood procedure, it will be desirable to flood the formation with water to substantially decrease alkalinity prior to the introduction of acid, simply as a means of economizing so that acid is not wasted in simply neutralizing residual alkalinity. Of course, this step is not necessary where the acid is injected into the oil-bearing formation prior to the first introduction of alkaline floodwater.

Following acidification, alkaline floodwater is injected into the oil-bearing formation with the result that additional oil is recovered from the formation over and above that recoverable by the normal tertiary procedure. Here too, to economize and avoid the waste of alkali in simply neutralizing acidity, prior to alkaline flooding, water is passed through the formation to decrease acidity.

The alkaline flood water can be any used by the prior art, such as aqueous solutions of alkaline, metal or ammonia hydroxide or carbonate or other alkaline salts such as sodium orthosilicate. The alkaline solution preferably has a pH range of about 9.5 to 12.5 and is injected in amounts within the range of about 2 pore volumes to about 15 pore volumes. The water used to constitute the aqueous alkaline solution is typically ground water containing a range of salts concentration, for example, from 1 to 2 parts per 100 to 1 to 2 parts per thousand.

The present invention can be further illustrated by the following examples, some of which are taken in conjunction with the figures.

EXAMPLE 1

The interfacial tension of an original crude oil sample from Long Beach, California was measured against distilled water containing 7500 ppm NaCl (to simulate ground water) at various concentration levels of sodium orthosilicate, ranging from 25 ppm to about 10,000 ppm. Another sample of the crude oil was shaken with an aqueous solution of 0.2 normal hydrochloric acid, for a period of minutes. The acidified oil was separated from the aqueous acid solution and its interfacial tension was measured by the above procedure.

Referring to FIG. 1, the relationship between the interfacial surface tension and alkalinity at various levels is shown, for the original crude and for the acidified oil. It will be seen that the acidified oil has a markedly lower interfacial tension than the original crude at all tested levels of alkalinity; it achieves very low interfacial tension levels at levels of alkalinity well below that at which the crude oil is first activated.

EXAMPLE 2

A crude oil sample from Example 1 was shaken with an alkaline aqueous solution containing 10,000 ppm sodium orthosilicate and 7,500 ppm NaCl, while samples were periodically withdrawn to measure the interfacial tension. Shaking was continued until the resultant oil had an interfacial tension greater than 10 dynes/cm. when measured against alkalinity ranging up to 10,000 parts per million of sodium orthosilicate. Thereafter, the sample was acidified by shaking with a solution of 0.2 normal hydrochloric acid. The interfacial tension of oil obtained from this acidification procedure was measured against alkalinity, again following the procedure of Example 1.

Referring to FIG. 2, the relationship between the interfacial tension and alkalinity at various levels is shown for the original crude and for the acidified oil. It will be seen that the acidification of the oil has reinduced activity lost during the time of oil-alkaline contact, to the point where interfacial activity has been substantially restored and where it again achieves low interfacial tension levels at low levels of alkalinity well below that at which the crude oil is first activated.

EXAMPLE 3

An oil reservoir was simulated by a horizontally disposed sand-packed cylindrical core 12 inches in length and 1 inch in diameter. To distinguish from acidization effects (e.g. permeability increase effects), the sand used was digested with 0.2 normal hydrochloric acid to constant dry weights (thereby stabilizing the sand), washed with water, and dried prior to use. The core was saturated with water (all aqueous solutions used in this experiment contain 75 ppm NaCl to simulate ground water), and the core volume was determined to be 64.7 c.c. by weighing before and after the addition of the water. The tube was then flooded with oil until the effluent from the tube contained mostly oil. The core was then flooded with water solution to simulate secondary water flooding. The amount of oil remaining in the core was determined by subtraction. The core was then flooded with an alkaline solution of 125 ppm sodium orthosilicate until oil was no longer found in the effluent. Flooding was repeated with increased alkaline concentrations of 500 and 3,000 ppm. The total amount of oil recovered by this first round of tertiary, alkaline flooding was found to be 8.5 c.c., which corresponded to 31.5% of the residual oil after secondary water flooding.

At this stage, the core was simulating a subterranean formation that had been depleted of alkaline recoverable oil. The core was then flooded with water to remove most of the alkalinity and then with a solution of 0.2 normal hydrochloric acid to reactivate the oil in accordance with the present invention. The acid flooding was carried out for 3 pore volumes, taking less than 24 hours. The core was then flooded with water solution to remove most of the acidity. During the acid and water floodings, no oil was found to come out of the core. At this point, a second round of alkaline floodings using 125, 500 and 3,000 ppm alkaline solution was carried out, as above described. As the result of alkaline flooding, after acid re-activation, another 7 c.c. of oil was recovered, corresponding to 26% of the residual oil after the initial secondary water flooding, or 40% of the oil which remained after the first round of alkaline flooding before the acid reactivation.

We claim:

1. A process for the recovery of oil from a subterranean oil-bearing formation, penetrated by spaced injection and production wells, comprising:

introducing into said formation an aqueous solution of acid selected from mineral acids and organic acids having less than 5 carbon atoms per molecule, whereby to potentiate at least portions of oil in said formation to recovery by alkaline flooding; and thereafter introducing floodwater into said formation to displace oil into said production well said floodwater consisting essentially of an aqueous alkaline solution.

2. A process for the recovery of oil from a subterranean oil-bearing formation, penetrated by spaced injection and production wells, comprising:

introducing into said formation at least one pore volume of an aqueous solution of acid selected from mineral acids and organic acids having less than 5 carbon atoms per molecule, whereby to potentiate at least portions of oil in said formation to recovery by alkaline flooding; and thereafter introducing alkaline floodwater into said formation to displace oil into said production well.

3. The process of claim 1 or 2 in which said alkaline floodwater has a pH of at least 9.5.

4. A process for the recovery of oil from a subterranean oil-bearing formation, penetrated by spaced injection and production wells, comprising:

introducing into said formation an aqueous solution of acid selected from mineral acids and organic acids having less than 5 carbon atoms per molecule, whereby to potentiate at least portions of oil in said formation to recovery by alkaline flooding; and thereafter introducing alkaline floodwater having a pH of at least 9.5 into said formation to displace oil into said production well.

5. The process of claim 1 or 4 in which said acid is introduced in an amount of at least 1 pore volume.

6. The process of claim 1, 2 or 4 in which said acid is at a concentration of at least 0.01 normal.

7. The process of claim 1, 2 or 4 in which said acid is a mineral acid.

8. The process of claim 7 in which said mineral acid is hydrochloric acid.

9. The process of claim 7 in which said mineral acid is sulfuric acid.

10. The process of claim 1, 2 or 4 in which said alkaline floodwater includes at least 200 ppm of sodium chloride.

11. The process of claim 1, 2 or 4 including the step of water flooding said formation after introduction of the acid solution to substantially decrease the acidity of said formation, prior to introduction of said alkaline floodwater.

12. The process of claim 1, 2 or 4 in which prior to introduction of acid solution, said formation is subjected to an initial alkaline water flooding procedure.

13. The process of claim 12, including the step, after said initial alkaline water flooding procedure and prior to the introduction of said acid solution, of water flooding to substantially decrease the alkalinity of said formation.

14. The process of claim 12, in which said initial alkaline water flooding procedure is conducted to substantial depletion of alkaline recoverable oil.

15. The process of claim 1, 2 or 4 including the steps, after said displacement of oil, of introducing into said formation an additional aqueous solution of said acid to further potentiate at least portions of oil in said formation to recovery by alkaline flooding, and thereafter introducing additional alkaline floodwater into said formation to displace additional oil to said production well.

16. A tertiary process for the recovery of oil from a substantially watered-out subterranean oil-bearing formation, penetrated by spaced injection and production wells, comprising:

introducing into said formation at least 1 pore volume of an aqueous solution of mineral acid at a concentration of at least 0.01 normal whereby to potentiate at least portions of oil in said formation to recovery by alkaline flooding;

thereafter introducing alkaline floodwater into said formation to displace oil to said production well.

17. A tertiary process for the recovery of oil from a substantially watered-out subterranean oil-bearing formation, which has been subjected to a first alkaline flooding procedure and substantially depleted of oil recoverable thereby, comprising:

water-flooding said depleted formation to substantially decrease the alkalinity thereof;

thereafter introducing into said formation at least 1 pore volume of an aqueous solution of mineral acid at a concentration of at least 0.01 normal, whereby to potentiate at least portions of oil in said formation to recovery by additional alkaline flooding;

water-flooding said potentiated formation oil to substantially decrease the acidity thereof; and thereafter introducing additional alkaline floodwater into said formation to displace oil to said production well.

18. The process of claim 16 or 17 in which said mineral acid is hydrochloric acid.

19. The process of claim 16 or 17 in which said mineral acid is sulfuric acid.

20. The process of claim 16 or 17 in which said alkaline flood water in each instance has a pH of at least 9.5.

21. The process of claim 16 or 17 including the steps after said displacement of oil, of introducing into said formation an additional aqueous solution of said acid to further potentiate at least portions of oil in said formation to recovery by alkaline flooding and thereafter introducing additional alkaline floodwater into said formation to displace additional oil to said production well.

* * * * *